United States Patent [19]

Wolf

[11] 4,150,692
[45] Apr. 24, 1979

[54] VALVE FOR CLOSING, THROTTLING OR REGULATING

[75] Inventor: Karl J. Wolf, Mannheim, Fed. Rep. of Germany

[73] Assignee: Weinheimer Gummiwerke GmbH, Fed. Rep. of Germany

[21] Appl. No.: 766,665

[22] Filed: Feb. 8, 1977

[30] Foreign Application Priority Data

Feb. 14, 1976 [DE] Fed. Rep. of Germany ....... 2606042

[51] Int. Cl.² ............................................. F16K 11/22
[52] U.S. Cl. .............................. 137/614.17; 251/205; 251/208
[58] Field of Search ...................... 137/614.17, 625.37, 137/625.32, 625.35; 251/208, 209, 205

[56] References Cited

U.S. PATENT DOCUMENTS

| 3,700,003 | 10/1972 | Smith | 137/614.17 |
| 3,763,890 | 10/1973 | Wolf | 137/614.17 |
| 3,966,119 | 6/1976 | Harter et al. | 251/209 |

FOREIGN PATENT DOCUMENTS

| 27177 | 1/1924 | France | 251/209 |
| 577617 | 6/1924 | France | 251/209 |

Primary Examiner—Arnold Rosenthal
Attorney, Agent, or Firm—Staas & Halsey

[57] ABSTRACT

A valve for closing, throttling or regulating having a closing-adjusting cone which is a hollow cylinder which while recessing a part of the cylinder jacket is developed with an opening throughout from the upper to the lower end surface as a partial shell.

11 Claims, 11 Drawing Figures

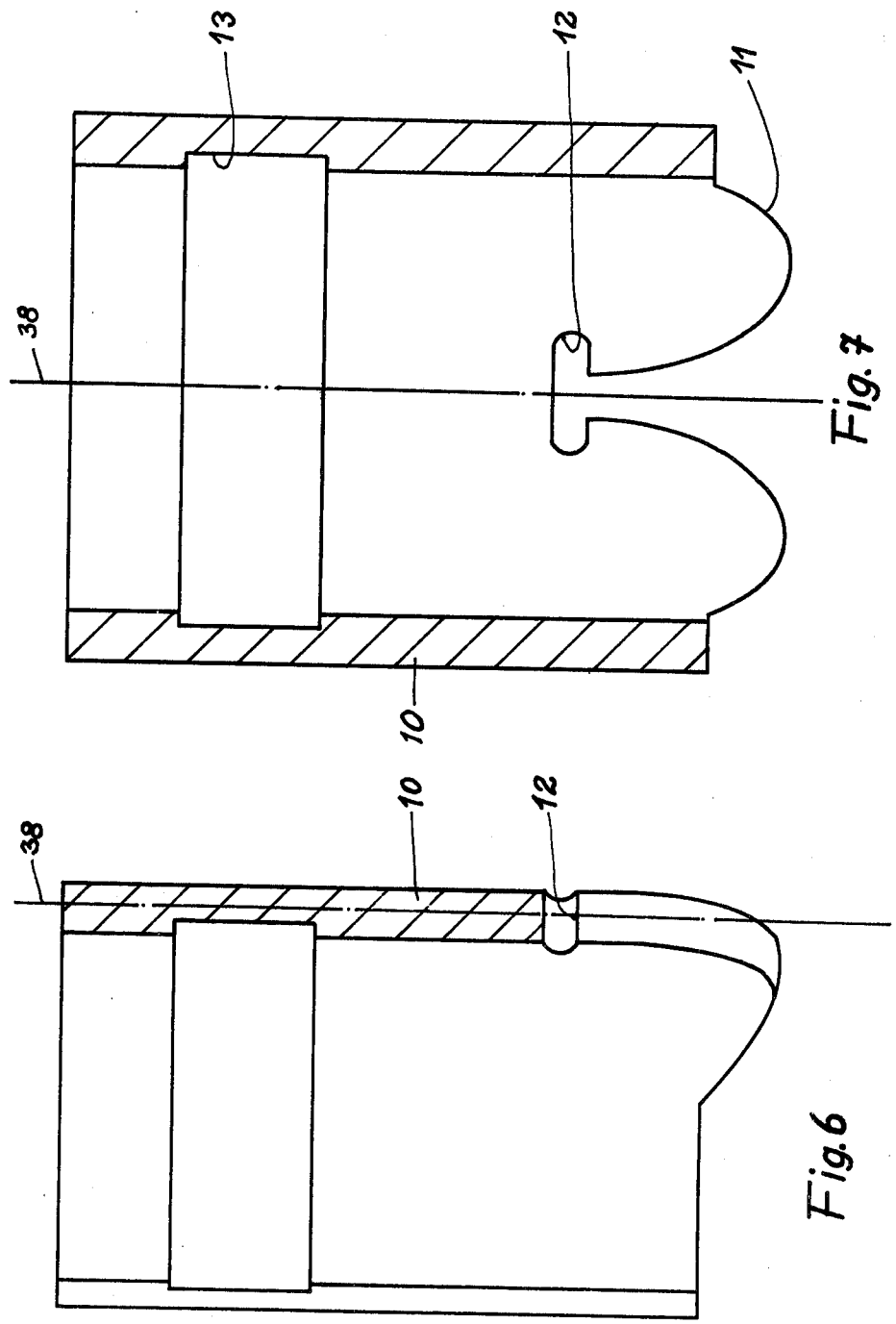

VALVE FOR CLOSING, THROTTLING OR REGULATING

BACKGROUND AND SUMMARY OF THE INVENTION

The present invention relates to a valve for closing, throttling or regulating, and in particular to a regulating valve in an automatic control system, consisting of a housing with a cylindrical closing-adjusting cone guided therein.

A great variety of types of closing mechanisms such as cocks or valves have been known. Cocks are constructed usually for small diameters and low pressures, while valves are constructed for larger diameters up to the highest pressures. One of the first conditions for a valve which is used for closing or throttling is the necessity of maintaining the valve gas tight in continuous operation. At the same time valves which are used for throttling are subject to particularly hard wear and tear. An additional condition for closing or throttling valves is their ease in opening and closing. This condition is also necessary for regulating valves which must be tight in the case of closing.

In the case of regulating valves, parabolic or bell-shaped cones are used as adjusting members which are flown against essentially on the front side. This type of regulation is conditioned on the fact that the regulating members must always be pushed against the flow of the material onto their bushing seat in order to close the armature. Thus, high adjusting forces result in direct dependence of the operating pressure existing at any time, which then acts as a differential pressure on the cone. This fact causes the occurrence of a hysteresis in the operating behavior which has very unpleasant consequences for the entire regulating valve, whereby the precision for regulation is influenced decisively.

Swiss Pat. No. 11,217 discloses a closing valve provided with a simple regulating cock having a cylindrical closing cone guided therein. In order to move the closing cone, however, large forces are necessary in order to overcome the frictional forces between the closing cone and the housing, so that this regulating cock is unsuitable particularly for regulation. U.S. Pat. No. 1,805,106 likewise discloses a throttle valve with a cylindrical closing cone for the movement of which likewise large frictional forces must be overcome. This throttle valve too is not suited for use in a regulating circuit of an automatic control system. Furthermore, from closure engineering, a large number of simple cocks or closing organs have been known in order to interrupt the flow of substances, which are more or less suitable for a tight closure of conducting systems, U.S. Pat. No. 3,526,249 contains, for example, a disclosure of a closing cock with a ball chick, in which an additional slide has been disposed. In terminal position the slide has a seat in the ball chick, whereby regulation of the flow of the stream of substance is not possible.

Furthermore, valves have been known which have control edges which are shaped in a certain way in order to impart a square or logarithmic characteristic line to the valve. British Pat. No 111,631 discloses a throttle valve with a flat slide disposed transversely to the flow of substance, whereby the control edge of the flat slide valve is developed in the shape of an arc or triangularly.

The present invention is based on the task of creating a valve of the initially mentioned type which, in order to move the closing-adjusting cone, the latter need overcome only very slight frictional forces between the cone and the housing; furthermore, the valve is to show practically no hysteresis.

The solution of this task consists in the fact that according to the present invention the closing-adjusting cone is a hollow cylinder which, while recessing a part of the cylinder jacket, is developed with an opening throughout from the upper to the lower cylinder cover surface as a partial shell.

The valve with its closing-adjusting cone developed according to the present invention has the important advantage that it practically has no hysteresis. The necessary forces for moving the closing-adjusting cone are reduced to a minimum, since complete pressure compensation develops within the closing or adjusting cone. The operating pressure is noticeable only by way of frictional forces between the partial shell and its guide within the housing. These frictional forces, however, are further reduced through the fact that the hollow cylinder, on the basis of its development as a partial shell and with thermal load, may adapt itself permanently to the expansion of its guide track, so that the operational behavior of the closing-adjusting cone, even in the case of very high temperatures, is without any problem. No jamming can occur on the basis of thermal expansion of the closing-adjusting cone.

Furthermore, the hollow cylinder in its upper part may have an annular groove. A traverse is firmly disposed in the annular groove on which a guide bar is disposed in the middle for the movement of the hollow cylinder. On the basis of the pressure compensation within the shell-shaped closing-adjusting cone, no transverse forces act on the guide bar which likewise contributes to the elimination of hysteresis. At the same time the traverse may be attached power coupled in the annular groove of the hollow cylinder, and the guide bar may likewise be connected firmly with the traverse so that the closing-adjusting cone is also rotatable around its longitudinal axis.

Furthermore, in an advantageous development of the present invention, the cylinder jacket may have a recess opposite the opening, wich extends up from the lower cylinder cover surface. This recess may be a bent rectangle or triangle in accordance with the cylinder jacket. Beyond that the lower edge of the jacket surface of the hollow cylinder may describe a curved line which is symmetrical to the middle, longitudinal axis lying in the partial shell, where by the edge travels around a recess inside the cylinder jacket surface which ends in a horizontal slit. Thus, all characteristic lines may be traveled, be they linear, square or logarithmic.

As a result of the fact that the closing-adjusting cone is developed as a partial shell, very slight production tolerances may be maintained between the housing and the closing-adjusting cone. As a result of this the valve according to the present invention is distinguished additionally by a very high degree of tightness. Furthermore, the shell-shaped closing-adjusting cone will permit the insertion of working materials which have a degree of hardness of 9, for example, oxide ceramics, glass ceramics, hard metals, etc. At the same time, both the housing as well as the closing-adjusting cone may be produced from one of these working materials. These working materials may be used because the closing-adjusting cone according to the present invention need not be forced down onto a valve seat in the housing for a complete closure contrary to parabolic or bell type cones or others, but the complete closure of the valve is achieved by a covering up of the continuous bore of the housing. As a result of that, furthermore, an easier production of the housing of the valve according to the present invention exists. As an additional working material, hard metal is also possibly suitable in this case.

The valve according to the present invention is suited for closure, throttling or regulation, where the highest degree of tightness and functional efficiency is required. The valve according to the present invention is suited especially for use as a regulating valve in an automatic control system, whereby only small adjusting forces are needed — as compared to the high and maximum pressures which may be controlled with the valve according to the present invention, which adjusting forces amount to only a fraction of those adjusting forces which are required in the case of regulating valves for the regulation of comparable pressures.

BRIEF DESCRIPTION OF THE DRAWINGS

FIG. 6 shows a longitudinal cut through an additional adjusting cone, the lower edge of the jacket surface of which describes a curved line which is symmetrical to the central longitudinal axis lying in the partial shell;

FIG. 7 shows a longitudinal cut of the adjusting cone in FIG. 6 turned by 90°, whereby the recess inside the cylinder jacket surface terminates in a horizontal slit;

DESCRIPTION OF THE PREFERRED EMBODIMENT

Figure 1:
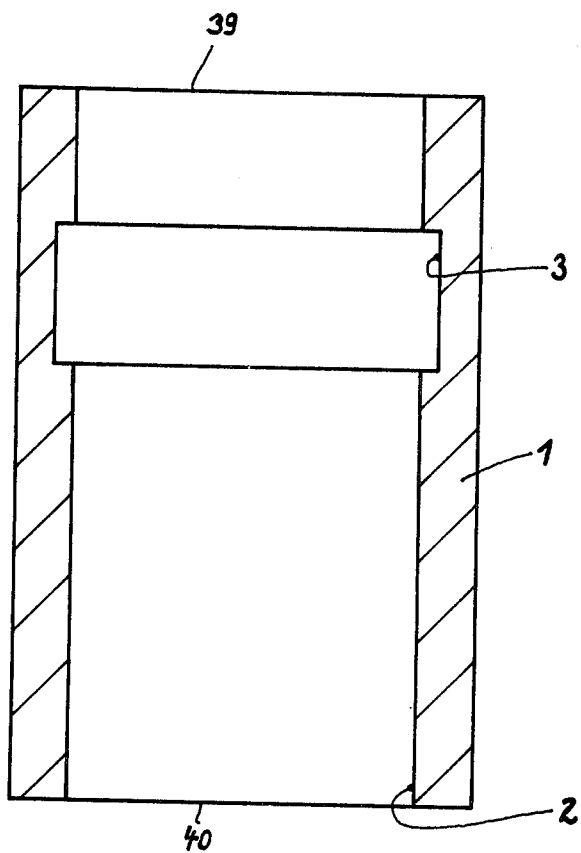
FIG. 1 shows a closing-adjusting cone according to the present invention in longitudinal cut for a valve which may be used arbitrarily for closing, throttling or regulating.
Figure 2:
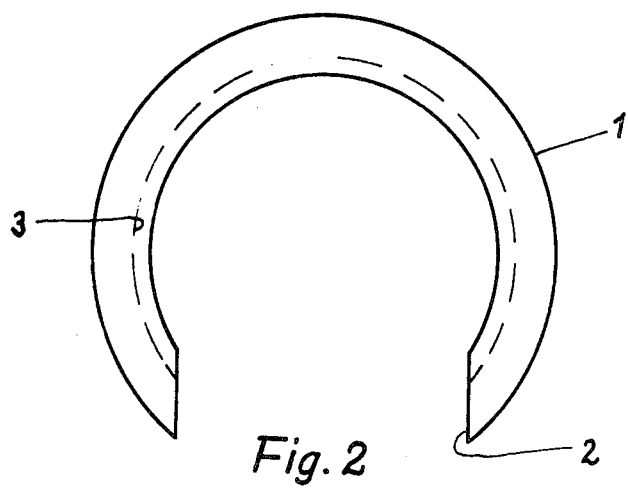
FIG. 2 is a top view of the closing-adjusting cone according to FIG. 1.

According to the FIGS. 1 and 2, the most simple embodiment of a closing and adjusting cone for a valve for closing, throttling and regulation according to the present invention consists of a hollow cylinder 1 which has an opening 2 of a part of the cylinder jacket, whereby the opening 2 passes from the upper cylinder end surface 39 down to the lower cylinder end surface 40, so that the hollow cylinder is developed as a partial shell or as a so-called shell cone. The designation "shell cone" is to be used in the following paragraphs for such a development of a hollow cylinder. The shell cone 1 has in its upper part, that is to say in its upper half, an annular groove 3 disposed inside which serves for the reception and guiding of a traverse which is not shown. The traverse serves for moving the shell cone. In the most simple embodiment of the shell cone according to the invention, the end surfaces 39 and 40 of the cylinder are plane-parallel.

Figure 3:
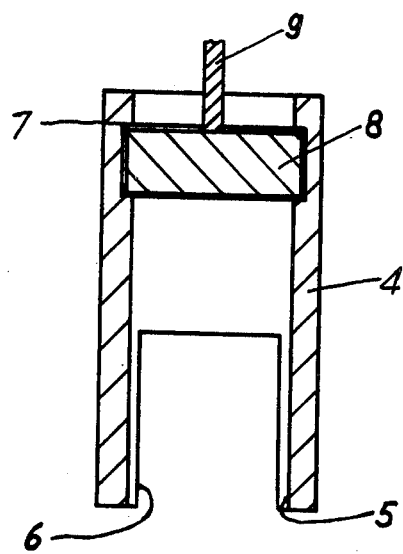
FIG. 3 shows a longitudinal cut through an adjusting cone for a regulating valve, whereby said adjusting cone has an additional recess in the form of a rectangle.
Figure 4:
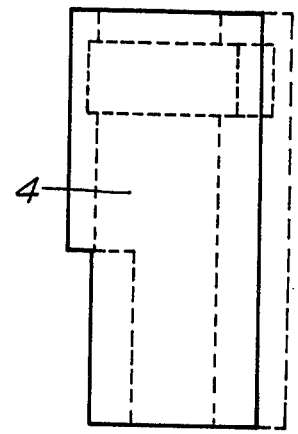
FIG. 4 is a side view of the adjusting cone according to FIG. 3.
Figure 5:
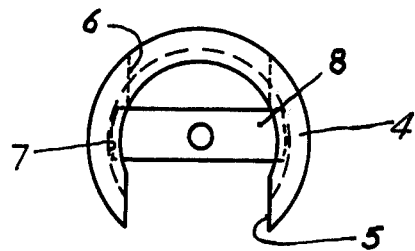
FIG. 5 is a top view of the adjusting cone according to FIG. 3.

FIGS. 3, 4 and 5 show a further example of a closing-adjusting cone, whereby this type of embodiment is used preferably as an adjusting cone in regulating valves. The adjusting cone again has a opening 5, so that it is developed as a partial shell cone. In the upper part of the partial shell cone is an annular groove 7 inside, in which a traverse 8 is disposed firmly. On the traverse in the middle, a guide bar 9 engages which serves for the movement of the adjusting cone. Furthermore it has a recess 6 opposite an opening 5 which extends up from the lower cylinder end surface and which is developed as a rectangle.

In FIGS. 6 and 7, an additional embodiment of an adjusting cone is shown which is developed as a shell cone 10. The lower edge 11 of the shell cone describes a curved line which is symmetrical in relation to the central longitudinal axis 38 of the adjusting cone lying in the partial shell. At the same time, the edge 11 travels around a recess inside the cylinder jacket surface which terminates in a horizontal slit 12. This slit is decisive for the adjusting relationship. The recess of the adjusting cone according to FIGS. 6 and 7 is likewise symmetrical in relation to the central longitudinal axis 38 and has been selected in such a way that a desired characteristic line will result. Therefore, the recess may have any arbitrary contour, as for example in FIG. 3 where it is rectangular.

Figure 8:
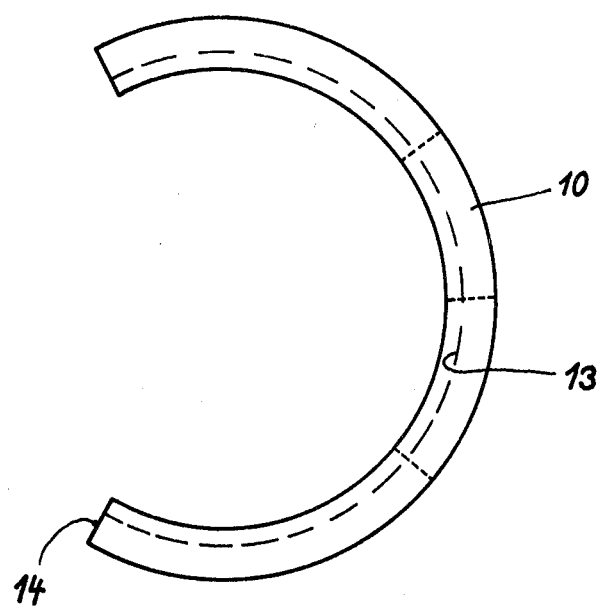
FIG. 8 and FIG. 9 show a top view or a longitudinal cut through an additional adjusting cone which has a triangularly shaped recess as a control curve.
Figure 9:
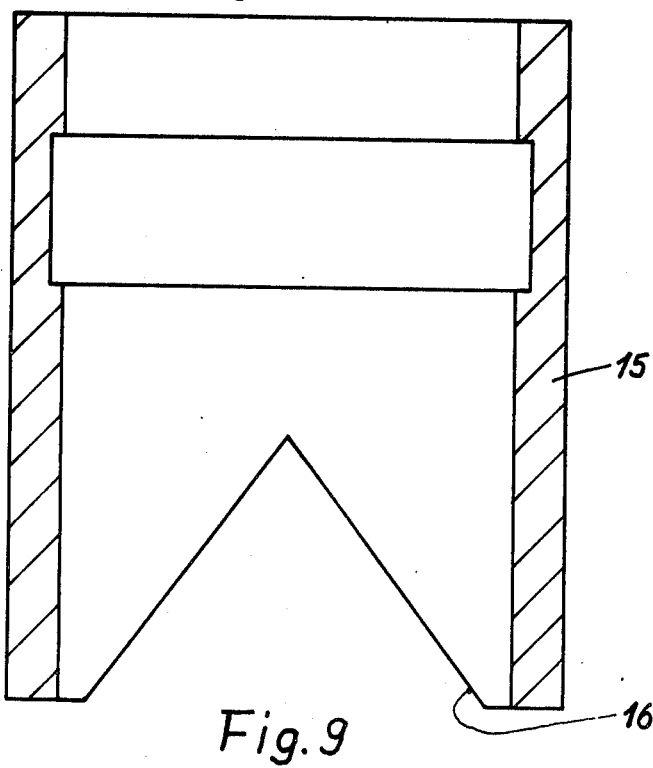

In FIGS. 8 and 9 an adjusting cone is shown which likewise is developed as a partial shell cone 15, whereby in this case the recess 16 is triangular. In FIGS. 6, 7, 8 and 9 the annular groove arranged inside is designated by reference number 13. Additionally in the case of the adjusting cone according to FIGS. 8 and 9, the longitudinal edges 14 which make up the recess are ground at right angles.

Figure 10:
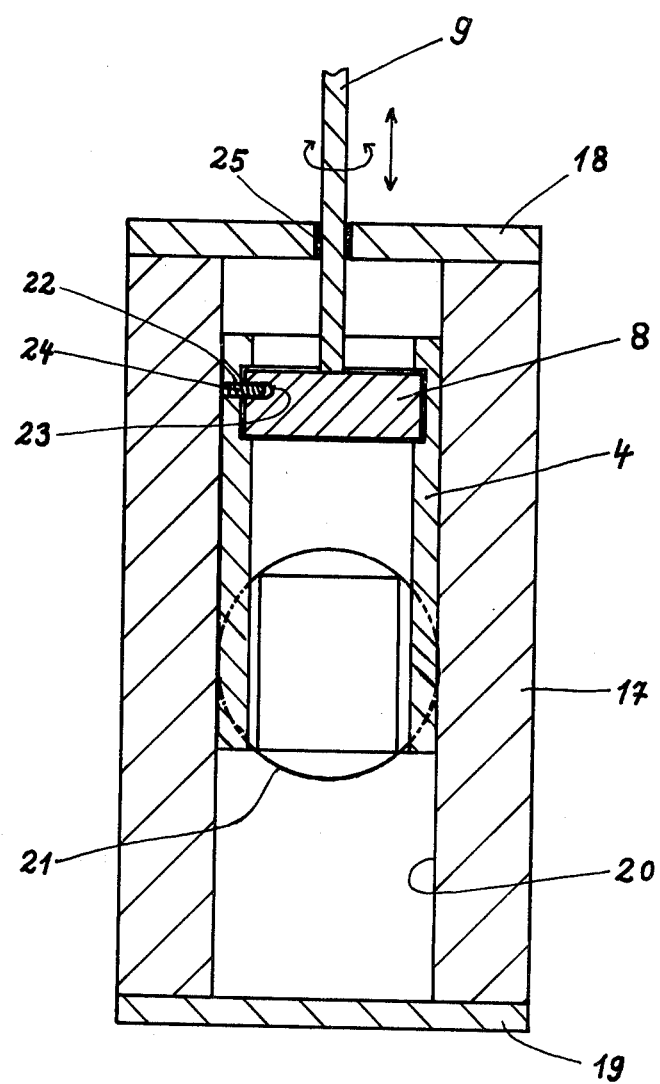
FIG. 10 shows a longitudinal cut through a closing valve consisting of a housing and closing cone.

FIG. 10 shows a longitudinal cut through a closing valve according to the present invention. The valve consists of a housing 17 which on the inside has a cylindrical guide path 20. The housing 17 is closed on top by an upper closing plate 18 and on the bottom by a lower closing plate 19. Inside the cylindrical guide bore 20, a closing cone has been disposed which, according to the invention, is developed as a partial shell cone 4 according to FIG. 3. The connection between the traverse 8 and the partial shell cone 4 may take place in the form of locking or power coupling. In this case, the partial shell cone 4 in the area of the annular groove has a bore 22 provided with a thread and likewise the traverse has a bore 23 at the same level provided with a thread. By means of an inbus screw 24, the traverse and the partial shell cone have been mutually arrested.

The guide bar 9 which is suitably and firmly connected with the traverse 8 projects through a bore inside of the upper closing plate 18, whereby this bore is sealed by means of a gasket 25. As indicated in FIG. 10 by the two arrows indicating movement, the closing cone is moveable both translatorily and rotatorily. The housing 17 furthermore has a circular bore 21 for the passage of the medium. The closing valve shown in FIG. 10 may also be used as a regulating valve.

Figure 11:
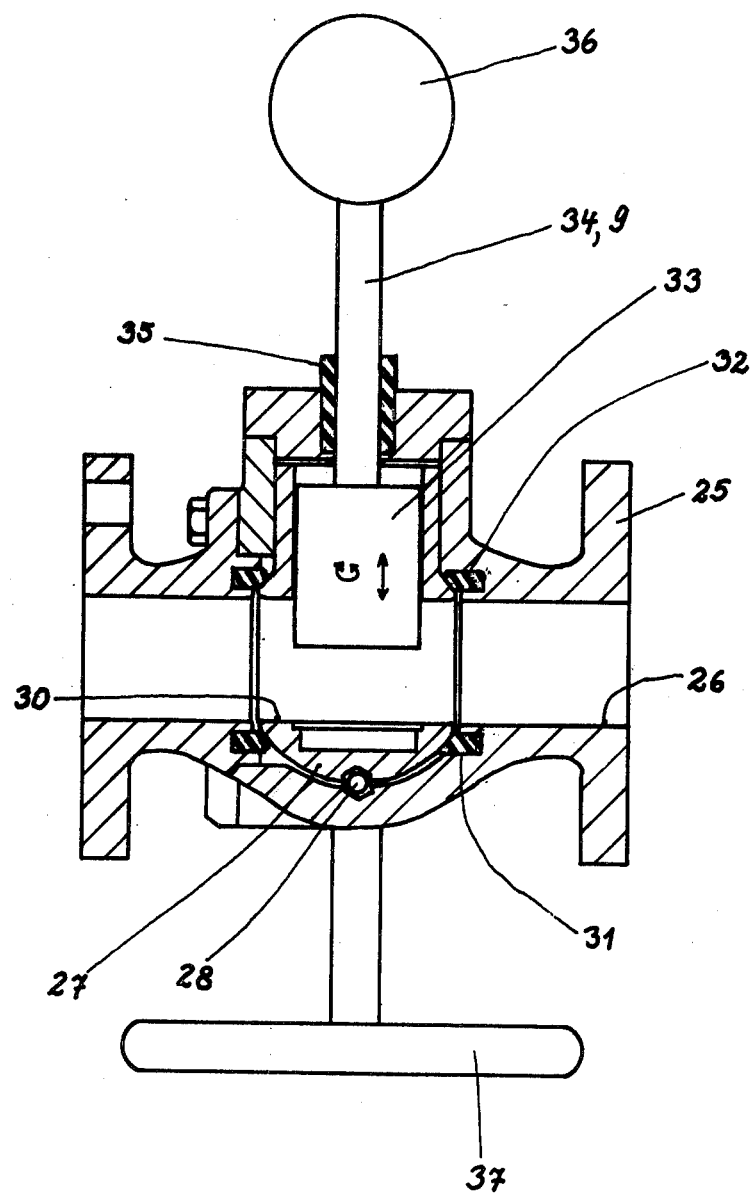
FIG. 11 shows a longitudinal cut through a regulating valve consisting of housing, ball chicks and adjusting cone disposed therein.

FIG. 11 shows an additional embodiment of a regulating valve according to the present invention. This valve consists of a housing 25 with a continuous bore 26 for the passage of the medium. Inside this housing a ball chick 27 has been arranged which is supported by way of the balls 28 vis-a-vis the housing 25 and is sealed by means of gaskets 31 or 32 vis-a-vis the housing 25. The ball chick likewise has a passage 30 which is aligned corresponding to the bore of passage 26 of the housing 25. Inside the ball chick which has cylindrical guide bore a control cone 33 has been arranged which may be developed according to FIGS. 1 to 9. The control cone 33 is connected with the guide bar 34 which corresponds to the guide bar 9 according to FIG. 3. The guide bar 34, 9 has been sealed by means of a gasket 35 vis-a-vis the housing 25. The reference number 36 designates an adjusting drive for the adjusting cone 33. The ball chick 27 may now be moved by way of a drive 37 of its own, whereby the drives 36 or 37 are independent of one another.

The examples show in FIGS. 1 to 11 always refer to valves where the closing-adjusting cone is acted against essentially at a right angle. However, the closing-adjusting valve according to the present invention is suitable for using in valves where the medium flows against the closing-adjusting cone at angles other than a right angle since on the basis of the development of the closing-adjusting cone as a partial shell cone a complete pressure compensation prevails within it.

I claim:

1. A valve device comprising:
   a housing having a continuous bore therethrough for the passage of fluid and another bore associated therewith;
   a cylindrical closing-adjusting cone mounted in said another bore;
   said cone consisting of a hollow cylinder with an opening therein extending from one cylinder end surface to the other cylinder end surface to form a partial cylinder shell;
   said hollow cylinder having in its upper inside an annular groove;
   a transverse member being disposed in said annular groove; and
   a guide bar centrally disposed on said traverse member for the purpose of moving the cone.

2. A valve as in claim 1, characterized in that the cylinder jacket has a recess which extends from the other cylinder end surface.

3. A valve as in claim 2, characterized in that the recess is a rectangle curved in accordance with the cylinder jacket.

4. A valve as in claim 2, characterized in that the recess is a triangle curved in accordance with the cylinder jacket.

5. A valve as in claim 1, characterized in that the lower edge of the jacket surface of the hollow cylinder describes a curved line which is symmetrical to the central longitudinal axis lying in the partial shell, whereby the edge of the recess passes around inside the cylinder jacket surface which terminates in a horizontal slit.

6. A valve as in claim 1, characterized in that the closing adjusting cone has been disposed rotatably around its centric longitudinal axis relative to the housing.

7. A valve as in claim 6, characterized in that inside the housing a ball chick has been disposed in which the closing-adjusting cone is guided, whereby the ball chick and the closing-adjusting cone are disposed rotatably independently of one another and relative to one another and to the housing.

8. A valve as in claim 1, wherein at least one of said housing and said closing-adjusting cone is made of a hard material selected from the group consisting of oxide ceramics, glass ceramics, and hard metal.

9. A regulating valve comprising:
   a housing having a continuous bore therethrough for the passage of a fluid substance;
   a ball chick mounted rotatably in said housing, said ball chick having a passage therethrough which may be in alignment with the continuous bore of said housing;
   said ball chick further having a cylindrical guide bore;
   a control cone mounted in said cylindrical guide bore;
   means for moving said control cone both longitudinally and rotatably with respect to said housing and ball chick; said control cone including a hollow cylinder having an opening in a part thereof to form a partial shell, an annular groove provided inside said partial shell near one end thereof, a traverse mounted by the ends thereof in the annular groove, and a guide bar for movement of the control cone affixed to said traverse.

10. A regulating valve as in claim 9, together with additional means for moving the ball chick relative to the housing and cone.

11. A regulating valve as in claim 9, together with gasket means for providing a seal between the ball chick and the housing, and further gasket means provided for a seal between the control cone actuating guide bar and the housing.

* * * * *